July 3, 1962 D. N. LYONS 3,042,089
FLUSH CUTTING PORTABLE ROTARY SAW WITH FLUSH GUARD
Filed March 15, 1961
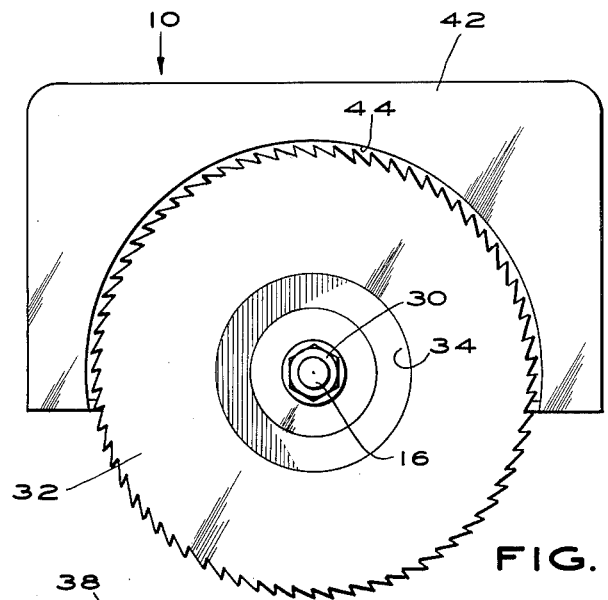
FIG. 1
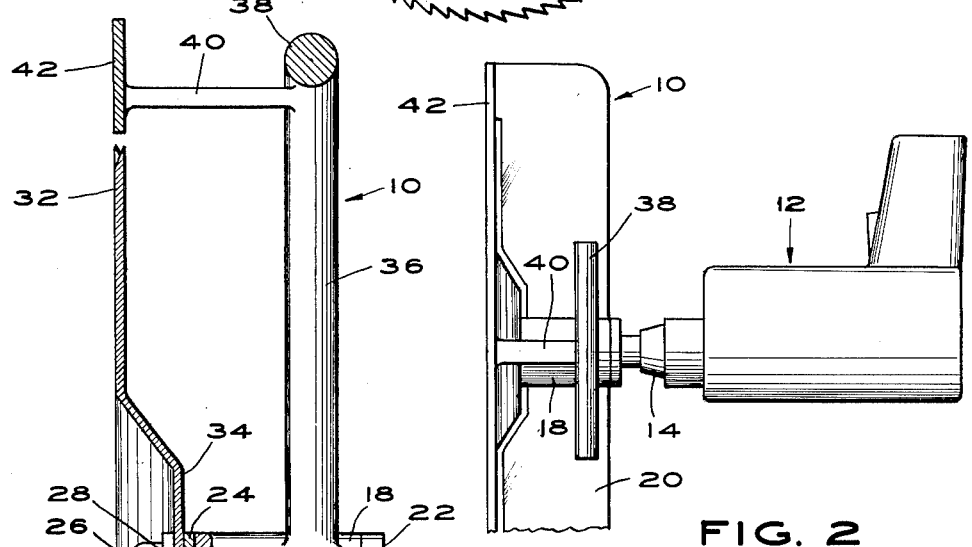
FIG. 2
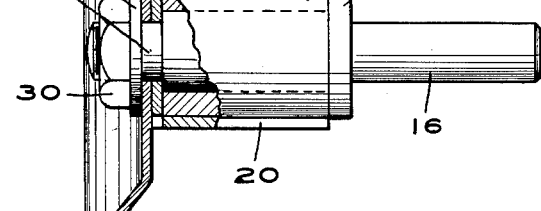
FIG. 3
INVENTOR
DONALD N. LYONS
BY 
ATTORNEY

# United States Patent Office 3,042,089
Patented July 3, 1962

3,042,089
FLUSH CUTTING PORTABLE ROTARY SAW WITH FLUSH GUARD
Donald N. Lyons, Greensville Post Office, Greensville, Ontario, Canada
Filed Mar. 15, 1961, Ser. No. 95,929
3 Claims. (Cl. 143—159)

The present invention generally relates to a saw construction and more particularly to a portable circular saw attached to a suitable power source such as a conventional portable drill motor or the like.

The primary object of the present invention is to provide a circular saw of the portable type constructed in such a manner that the sawing operation may be conducted at a point substantially flush with a wall surface or the like.

Present day portable powered saws cannot saw flush with a wall surface due to the normally provided housing, drive shaft and the guard which projects beyond the plane of the saw blade. The present invention overcomes this problem by providing a saw blade having a dished or recessed central portion for attachment to the end of a drive shaft whereby the end of the drive shaft and retaining nut are received within the dished or recessed portion and do not protrude beyond the plane of the main portion of the blade. The saw blade guard is disposed in the same plane as the guard and supported solely from the same side as the drive shaft thereby enabling the saw blade to be operational substantially flush against a wall surface.

A further object of the present invention is to provide a saw in accordance with the preceding objects which is simple in construction, safe in operation, effective for its particular purposes and generally inexpensive to manufacture.

These, together with other objects and advantages which will become subsequently apparent reside in the details of construction and operation as more fully hereinafter described and claimed, reference being made to the accompanying drawings forming a part hereof, wherein like numerals refer to like parts and use and in which:

FIGURE 1 is a side elevation of the saw of the present invention;

FIGURE 2 is a top plan view illustrating the saw attached to a power drill motor; and FIGURE 3 is a longitudinal sectional view with portions shown in elevation and illustrating the structural details thereof.

Referring now more specifically to the drawings, the numeral 10 generally designates the saw of the present invention adapted to be connected with a suitable motor or power source such as the portable drill motor 12 having a chuck 14 as shown in FIGURE 2.

The saw 10 includes a power or drive shaft 16 adapted to be received in the chuck 14 or connected to any suitable motor or the like. The shaft 16 is journaled in bearing 18 supported on a transversely extending table 20. One end of the bearing 18 is engaged by a thrust collar 22 at one end thereof which is rigid with the shaft 16 and at the other end by a thrust washer 24 also rigid with the shaft 16.

The shaft 16 is provided with a reduced end 26 receiving a clamping washer 28 and a retaining nut 30 screw threaded thereon. Mounted on shaft 16 is a circular saw blade 32 having a dished or recessed central portion 34 received on the reduced end 26 between washers 28 and 24.

Extending upwardly from the bearing 18, there is provided a post 36 rigid therewith. The post 36 is provided with a transverse handle 38 at the upper end thereof in order to facilitate manipulation of the saw. The post 36 is also provided with a laterally extending brace or rod 40 generally paralleling the shaft 16. A guard plate 42 is rigidly supported by the brace 40 and the table 20 is in alignment with the saw blade 32 and includes a generally semicircular recess 44 in the bottom edge thereof for receiving the upper portion of the saw and in generally spaced concentric relation to the periphery of the upper half of the saw blade 32.

The saw blade 32 is substantially the same thickness as plate 42 or may be slightly thicker whereby the plate 42 may follow the saw blade 32 into the kerf formed thereby. This construction enables the saw blade 32 to be employed closely adjacent a wall surface since one surface of the saw blade is unobstructed since even the end of shaft 16 and the clamping nut is recessed in the dished portion of the saw blade.

The foregoing is considered as illustrative only of the principles of the invention and further, since numerous modifications and changes will readily occur to those skilled in the art, it is not desired to limit the invention to the exact construction and operation shown and described. What is claimed as new is as follows:

1. A flush cutting portable rotary saw of the type described, comprising a normally horizontal rotatable shaft, a bearing for said shaft, a circular saw blade having a body portion of a predetermined thickness of material, means for mounting said saw blade on an end portion of said shaft whereby said saw blade is arranged so that the outer face of the saw blade is unobstructed, a guard plate having a thickness corresponding substantially with the thickness of the body of said saw blade, and means carried by said bearing and terminating at its upper end in a plane above the periphery of the saw blade for supporting said guard plate substantially in alignment with the body of said saw blade whereby said guard plate is substantially flush with the saw blade and follows the saw blade into the kerf formed thereby.

2. A flush cutting portable rotary saw of the type described, comprising a normally horizontal rotatable shaft, a bearing for said shaft, a table for supporting said bearing whereby said table is arranged in a plane beneath said bearing and extends transversely with respect to said shaft to present a longitudinally extending front edge portion arranged substantially at right angles with respect to the longitudinal axis of said shaft, a circular saw blade having a body portion of a predetermined thickness of material, means for mounting said saw blade on an end portion of said shaft whereby said saw blade is arranged substantially spaced from and in parallel relationship in front of the longitudinal front edge portion of said table, the saw blade mounting means on said shaft being arranged so that the outer face of the saw blade is unobstructed in a plane at right angles to the axis of rotation thereof, a handle means including a post projecting upwardly from said bearing and terminating at its upper end in a plane above the periphery of the saw blade, a guard plate having a thickness corresponding substantially with the thickness of the body of said saw blade, and means carried by said handle means for supporting said guard plate substantially in alignment with the body of said saw blade whereby said guard plate is substantially flush with the saw blade and follows the saw blade into the kerf formed thereby.

3. A flush cutting portable rotary saw of the type described, comprising a normally horizontal rotatable shaft, a bearing for said shaft, a table for supporting said bearing whereby said table is arranged in a plane beneath said bearing and extends transversely with respect to said shaft to present a longitudinally extending front edge portion arranged substantially at right angles with respect to the longitudinal axis of said shaft, a circular saw blade having a main body portion of a predetermined thickness of material and a dished central portion offset with respect to the main body portion, means for mounting the dished offset portion of said saw blade on an end portion of said shaft whereby the main body portion of said saw blade is arranged substantially spaced from and in parallel relationship with respect to the longitudinal front edge portion of said table, the saw blade mounting means on said shaft being arranged entirely within the central dished portion of said saw blade, a handle means including a post projecting upwardly from said bearing and terminating at its upper end in a plane above the periphery of the saw blade, a guard plate having a thickness corresponding substantially with the thickness of the main body portion of said saw blade, and means carried by said handle means for supporting said guard plate substantially in alignment with the main body portion of said saw blade whereby said guard plate is substantially flush with the saw blade and follows the saw blade into the kerf formed thereby.

References Cited in the file of this patent
UNITED STATES PATENTS

| | | |
|---|---|---|
| 787,532 | McCreery | Apr. 18, 1905 |
| 1,156,722 | Tappan | Oct. 12, 1915 |
| 1,623,290 | Wappat | Apr. 5, 1927 |
| 1,785,065 | Aborn | Dec. 16, 1930 |
| 2,273,160 | Tuck | Feb. 17, 1942 |
| 2,952,281 | Weber | Sept. 13, 1960 |